Sept. 2, 1958     M. J. RAPPEPORT ET AL     2,849,919
SHOCK ABSORBENT MOUNTING FRAME FOR PORTABLE MIRRORS
Filed Oct. 7, 1955
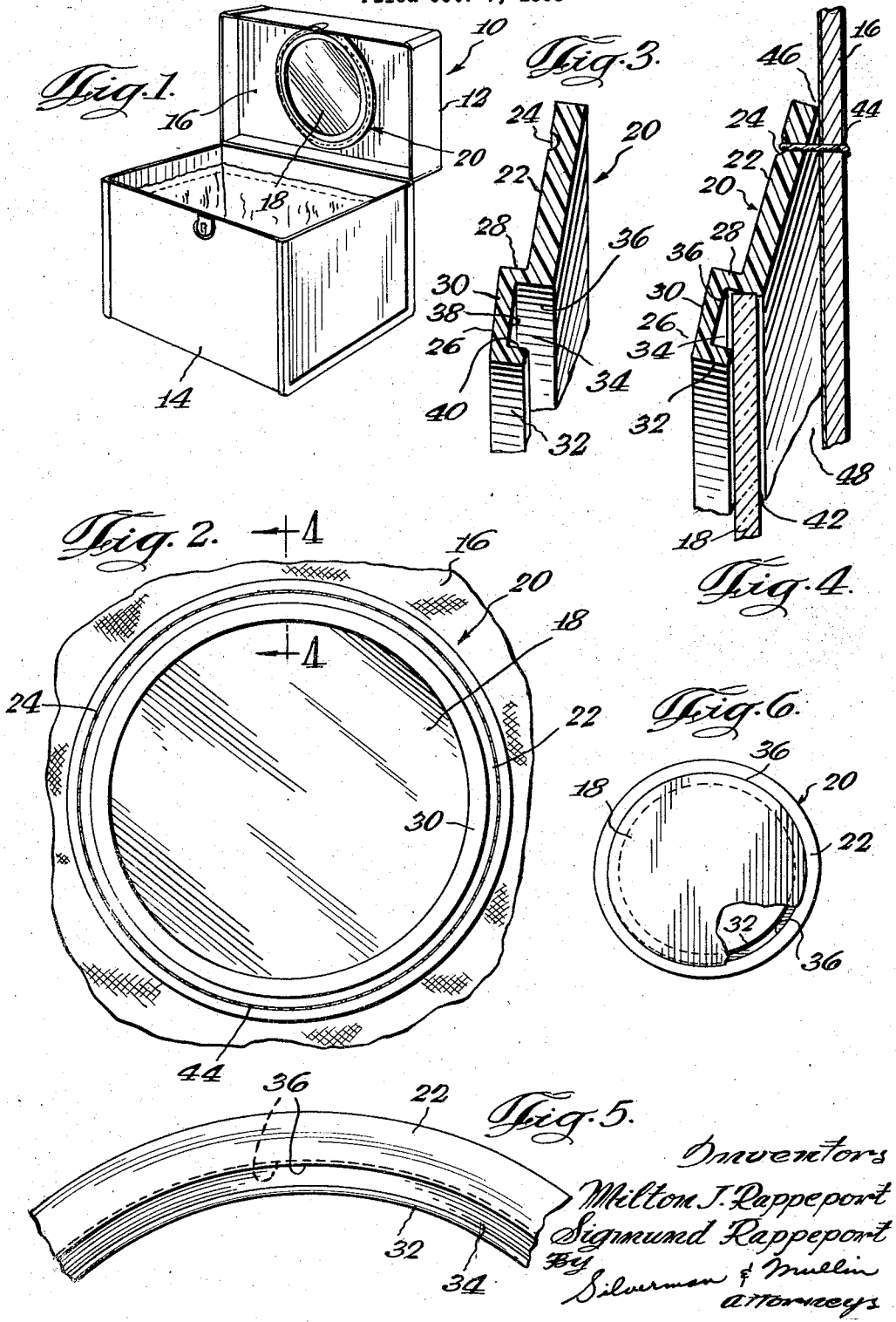

United States Patent Office 2,849,919
Patented Sept. 2, 1958

2,849,919
SHOCK ABSORBENT MOUNTING FRAME FOR PORTABLE MIRRORS

Milton J. Rappeport and Sigmund Rappeport, Chicago, Ill., assignors to R. E. Rappeport & Sons, Inc., Chicago, Ill., a corporation of Illinois Application October 7, 1955, Serial No. 539,206

8 Claims. (Cl. 88—97)

This invention relates to improvements in mounting frames for portable mirrors and the like such as are sometimes used to mount mirrors on the inside surface of the cover of ladies' toilet or cosmetic luggage cases. More particularly the invention relates to a flexible, elastic frame affording cushioned, shock-absorbent mounting for mirrors or the like in such portable cases which are oftentimes subjected to rough handling during transportation of the same.

It is well known that dressing cases or similar ladies' luggage oftentimes have attached to the inside surface of the lid of the case, or some other appropriate portion thereof, a mirror or the like. Such mirrors are used by females during traveling for completing their toilet or applying cosmetics. Since such cases are often subjected to rough handling during transportation, heretofore excessive breakage thereof has occurred. At least to our knowledge no satisfactory method or device for mounting said mirrors in such a manner as to reduce the aforementioned breakage has to date been perfected.

Moreover heretofore such frames have been constructed of non-elastic and in some cases non-flexible, frames which not only afforded little or no protection against mirror breakage by rough handling, but also were incapable of preventing breakage due to expansion and contraction occasioned by the variations in temperature.

It is therefore an important object of this invention to afford a mirror mounting frame of the character described which will overcome all of the objections mentioned hereinabove.

Another object is to provide a mirror mounting frame so constructed that when properly mounted or affixed in position, it will automatically afford an air cushion between the mirror and the luggage lid.

A further object is to afford a mounting member of the character described which will not be adversely affected by temperature variations, but instead will afford inherent compensation for expansion and contraction, thereby minimizing the strain and stress on the mirror itself.

Still another object is to afford a mounting frame which may be readily affixed to a luggage lid or the like by simple conventional means such as stitching. A related object is to afford means in the frame itself for protecting the attaching means or stitching.

Still a further object is to provide a mounting frame of the character described having means for sealing the marginal edges of the mirror against the admission of extraneous materials into the space between the mirror and the mounting frame itself.

Yet another object is to provide mirror mounting means of the character described which, though quite inexpensive, is most attractive and effective.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of an article of luggage showing a mirror mounted by a frame embodying the principles of our invention in the lid or cover of said case;

Fig. 2 is a front view of a mirror and frame mounted in operational position on a fragmentary portion of a luggage lid;

Fig. 3 is an enlarged cross-sectional view of a fragmentary portion of the mounting frame alone;

Fig. 4 is an enlarged sectional view taken on the plane of line 4—4 in Fig. 2 of the drawings and viewed in the direction indicated;

Fig. 5 is an enlarged fragmentary rear view of our mounting frame; and

Fig. 6 is a rear view of a mirror in the process of being assembled in our mounting frame with a portion of the mirror broken away to illustrate certain details of construction and of the manner of assembling the same.

Referring first to Fig. 1 of the drawings, reference numeral 10 indicates generally a cosmetic or dressing case including a lid 12 hingedly mounted on a case 14. The lid 12 includes a top wall 16 having a mirror 18 (in the embodiment chosen for illustration, circular in shape) affixed or mounted to the inner surface of the wall 16 by means of a novel mounting frame designated generally by reference numeral 20.

The mounting frame 20 is preferably made of a material having properties of limited but appreciable flexibility and elasticity, yet of sufficient strength and stiffness to afford a stable, sturdy mounting. We have found that the ideal such material is a plastic such as polyethylene, and we have further found that the preferable method of fabricating such frames is by injection molding.

Referring now to Figs. 2, 3 and 4 of the drawings, attention is directed to the novel cross-sectional contours and shape of the frame. The molding strip frame is formed with an outer segment 22 which is disposed in an inclined plane. A groove such as 24 is formed annularly in the top surface of the segment 22 in spaced relationship with the outer edge thereof, the function of which will become apparent as the description proceeds.

Integrally formed at the inner end of the segment 22 is a channel-like segment 26 having a leg 28 adjacent to the end of the segment 22, a wall segment 30 and an inwardly disposed leg 32 of somewhat shorter dimension than the leg 28.

A channel-shaped groove 34 defined by inner walls 36, 38 and 40 is contained within the channel 26. It will be noted that the wall 36 slopes slightly downwardly and outwardly and that the wall 38 likewise slopes downwardly towards wall 36. The reason for this particular construction and the function of the groove 34 itself will become apparent as the description proceeds.

Referring now to Fig. 4 of the drawings, it will be noted that the depth of the groove 34 exceeds the thickness of the mirror 18. Thus when the mirror 18 is assembled within the frame 20, a portion 42 of the groove wall 36 protrudes above the back of the mirror 18. Thus the mirror 18 is recessed within the frame 20. Again the purpose thereof will become apparent as the description proceeds.

Referring now to Fig. 6 of the drawings, it will be noted that the size of the mirror 18 is somewhat larger than the size of the frame opening as measured from the groove wall 36. Thus it will be perceived in Fig. 6 of the drawings that the outer edge of that portion of the mirror 18 (illustrated at the bottom of the drawings) which has not yet been assembled or positioned within the frame opening, protrudes beyond the groove wall 36. Hence it is necessary to stretch the frame 20 in order to assemble the mirror within the frame. This not only insures a tight-fitting relationship between the mirror and the frame, but moreover tends to cant the frame segment 22 thereby forming in effect a dished area at the back of the assembled mirror and frame. Again the purpose of this construction will be revealed as the description proceeds.

Referring again to Fig. 4 of the drawings, it will be noted that the outer end of the channel leg 32 abuts the front surface of the mirror 18, which again tends to cant the frame 20 with relationship to the mirror 18, thereby further contributing to the dished effect behind the mirror. However, the primary function of this structure is to insure an effective seal between the frame and the mirror. This not only blocks the admission of extraneous matter such as dust, moisture, etc., into the groove 34 as well as behind the mirror itself, but also maintains the mirror in firm, substantially immovable and cushioned relationship within the frame.

After the mirror 18 has been assembled within the frame 20, the assembly is readily mounted to the lid wall 16 by very simple but most effective means such as stitching 44. Such mounting means not only insures secure adhesion of the mirror and frame to the lid but moreover contributes to the flexibility of the mounting which obviously is essential in portable luggage cases and the like. It will further be perceived that the groove 24 is provided for the purpose of accommodating therein the stitching 44 thereby forming a protective channel with the stitching recessed within the frame segment 22 so that it does not protrude above the upper surface of the frame. This construction not only protects the stitching against accidental tearing or abrasion but also is conducive to minimizing the soiling thereof. Obviously, other securing means may be substituted for the stitching, such as, for example, a suitable adhesive.

Referring once more to Fig. 4 of the drawings, it will be noted that only the outer edge of the frame 20 actually abuts the lid wall 16 as at 46. Thus only the peripheral edge of the frame actually contacts the wall 16. The mirror 18 itself is spaced from the luggage wall 16 and is cushioned by the air pocket formed in the dish-shaped cavity 48 positioned between the mirror and the wall. There is thus afforded a cushioning and shock-absorbent layer of air which effectively minimizes breakage and jarring of the mirror.

From the drawings and description as set forth hereinabove it will readily be perceived that we have provided a unique, simple but most effective and attractive means for framing and mounting a mirror, or similar fragile object, which is especially effective in situations where the mirror or object is likely to be subjected to jarring, shock or the like. Such conditions are encountered in portable luggage cases, particularly ladies' cosmetic and dressing cases wherein the mirror is preferably mounted on the inner wall of the case lid. It will be noted that by constructing the frame of a material having limited but appreciably noticeable flexibility and elasticity and further designing the frame in such a manner as to afford a dish-shaped cavity between the mirror and the luggage case lid, substantial and effective cushioning of the mirror is provided thereby materially reducing the breakage heretofore encountered under the aforementioned conditions. We have further afforded a mounting frame which may be readily attached in operative position by simple flexible stitching means, said stitching means positioned in a groove which affords substantial protection to the stitching means itself. Although the invention has been described in connection with the mounting of a mirror it should be apparent that the frame may be used for mounting various fragile objects such as panes of glass or the like and may likewise be used to frame and mount pictures and photographs.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. A frame member for supporting a sheet of frangible material on a pivotal planar surface in substantial shockproof condition comprising: a sheet of frangible material such as a mirror plate, a thin molding formed of a material characterized by limited and appreciable flexibility and elasticity, said molding including a continuous, channel-shaped segment arranged to define a central retaining window for the said sheet of frangible material the plane of which is transverse to the direction of opening of the channel and an elongate flat segment integral with and encircling the channel segment exterior of the window, said window being adapted to retain the sheet of frangible material therein with the marginal edges of the sheet frictionally engaged with only one leg of the channel, said flat segment adapted to be secured to said surface for installing the frame with the sheet member spaced from and substantially parallel with said surface, said installed frame projecting in relatively low relief from said surface.

2. The mounting frame of claim 1 in which a median portion of said elongate outer segment is formed with a groove adapted to accommodate therein means for fastening the frame to a said planar surface.

3. The mounting frame of claim 1 in which the depth of said channel is substantially greater than the thickness of the sheet whereby the marginal edges of the sheet are positionable in said channel in recessed relationship to the flat segment.

4. In combination, a mirror and a mounting frame for supporting the mirror on the lid of a luggage case, said frame comprising a thin integral strip member molded from a flexible and elastic material of suitable rigidity for supporting the mirror, said member arranged to form a central window in which the mirror is retained, said member including a plural-legged channel-shaped formation next adjacent and surrounding the window and a peripheral, elongate planar segment exterior of the window and coextensive with said channel formation, said mirror being retained in the window with the marginal edges of the mirror frictionally engaging a first leg of said channel formation, said planar segment capable of attachment to the lid with the mirror spaced from and substantially parallel to the lid, said attached frame displacing a minimum of the luggage case's storage volume.

5. The combination of claim 4 in which the second leg of said channel formation abuts the front surface of the mirror in substantially sealing relationship therewith, said planar segment adapted to be so attached as to form a substantially air-tight seal providing an air cushion between said lid and rear surface of the mirror in said space.

6. The combination of claim 5 in which the size of said window is slightly less than the size of the mirror prior to installation of the mirror therein, whereby said first leg is tensioned when the mirror is so installed.

7. The combination of claim 4 in which the size of said window is slightly less than the size of the mirror prior to installation of the mirror therein, said first leg having the interior surface thereof engaging said marginal edges and said planar segment being angularly disposed relative to the plane of the mirror when retained in the window.

8. The combination of claim 7 in which said planar segment is formed with an annular groove in the top surface thereof to accommodate therein a line of stitching for so attaching the frame, said planar segment adapted to have a free edge thereof abut said lid in sealing relationship to affect formation of an air cushion between the mirror and the lid in said space when the frame is attached.

References Cited in the file of this patent

UNITED STATES PATENTS

| | | |
|---|---|---|
| 886,273 | Tanzey | Apr. 28, 1908 |
| 1,139,560 | Mosher | May 18, 1915 |
| 1,556,648 | Symms | Oct. 13, 1925 |
| 1,734,979 | Persons | Nov. 12, 1927 |
| 1,872,218 | Asplund | Aug. 16, 1932 |
| 2,012,933 | Davidson | Aug. 27, 1935 |
| 2,030,255 | Howard | Feb. 11, 1936 |
| 2,389,234 | Harrison | Nov. 20, 1945 |
| 2,555,717 | Turpin | June 5, 1951 |

FOREIGN PATENTS

| | | |
|---|---|---|
| 425,138 | Great Britain | Mar. 7, 1935 |
| 520,469 | Great Britain | Apr. 24, 1940 |